(12) United States Patent
Weinbrecht et al.

(10) Patent No.: US 12,551,999 B2
(45) Date of Patent: Feb. 17, 2026

(54) OVERLOAD CLUTCH FOR A HAND-HELD POWER TOOL

(71) Applicant: Robert Bosch GmbH, Stuttgart (DE)

(72) Inventors: Maximilian Weinbrecht, Altdorf (DE); Michael Haigis, Merklingen (DE); Selim Mustafa, Waiblingen (DE); Thomas Duerr, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/581,634

(22) Filed: Feb. 20, 2024

(65) Prior Publication Data
US 2024/0278404 A1     Aug. 22, 2024

(30) Foreign Application Priority Data
Feb. 20, 2023   (DE) ............... 10 2023 201 446.7

(51) Int. Cl.
*B25D 16/00*     (2006.01)
*B25F 5/00*      (2006.01)

(52) U.S. Cl.
CPC ............ *B25D 16/003* (2013.01); *B25F 5/001* (2013.01); *B25D 2250/165* (2013.01); *B25D 2250/321* (2013.01); *B25D 2250/331* (2013.01)

(58) Field of Classification Search
CPC ............ B25D 16/003; B25D 2250/321; B25D 2250/165

See application file for complete search history.

(56) References Cited

U.S. PATENT DOCUMENTS

2006/0124331 A1* 6/2006 Stirm .................... F16D 43/208
                                                        173/178
2021/0308853 A1* 10/2021 Ebner .................... B25D 17/08

FOREIGN PATENT DOCUMENTS

DE       37 38 311 A1     6/1988
EP        2291267 B1     10/2012

* cited by examiner

*Primary Examiner* — Daniel Jeremy Leeds
(74) *Attorney, Agent, or Firm* — Maginot, Moore & Beck LLP

(57) ABSTRACT

An axial bearing for reducing wear is provided in an overload clutch for arrangement between a drive unit and a power take-off unit of a hand-held power tool in order to enable decoupling of the drive unit from the power take-off unit in the hand-held power tool when a limit torque is exceeded.

11 Claims, 4 Drawing Sheets

OVERLOAD CLUTCH FOR A HAND-HELD POWER TOOL

This application claims priority under 35 U.S.C. § 119 to application no. DE 10 2023 201 446.7, filed on Feb. 20, 2023 in Germany, the disclosure of which is incorporated herein by reference in its entirety.

The present disclosure relates to an overload clutch for arrangement between a drive unit and a power take-off unit of a hand-held power tool, in order to enable decoupling of the drive unit from the power take-off unit in the hand-held power tool when a limit torque is exceeded.

BACKGROUND

An overload clutch for arrangement between a drive unit and a power take-off unit of a hand-held power tool is known from the prior art. The overload clutch in the hand-held power tool enables the drive unit to be decoupled from the power take-off unit if a limit torque is exceeded.

SUMMARY

The disclosure relates to an overload clutch for arrangement between a drive unit and a power take-off unit of a hand-held power tool, in order to enable decoupling of the drive unit from the power take-off unit in the hand-held power tool when a limit torque is exceeded. An axial bearing is provided to reduce wear.

The disclosure thus makes it possible to provide an overload clutch for a hand-held power tool, in which the axial bearing enables a rolling movement between radially and axially moving parts and thus a reduction in friction with an associated reduction in wear can be achieved.

Preferably, the overload clutch is designed as a rotating slipping clutch with an associated axis of rotation and has a spring element and detent bodies acted upon by the spring element, wherein the axial bearing is arranged in the direction of the axis of rotation between the spring element and the detent bodies.

This enables a suitable arrangement of the axial bearing in a simple manner.

Preferably, a drive coupling element is provided, which is designed for coupling with a transmission element of a drive unit, and a coupling element is provided, which has a guide path for guiding the detent bodies, wherein the axial bearing is arranged in a direction perpendicular to the axis of rotation between an internal receptacle of the drive coupling element and an outer circumference of the coupling element.

This makes it easy and uncomplicated to achieve a compact design of the overload clutch.

A drive coupling element and an power take-off coupling element are preferably provided, which are operatively connected to a clutch shaft.

Thus, a robust and stable overload clutch, with drive unit and power take-off unit coupled to each other, can be provided.

The present disclosure also relates to a hand-held power tool with a housing in which a drive unit for driving a power take-off unit designed as a tool holder is arranged, wherein an overload clutch according to the disclosure is arranged between the drive unit and the power take-off unit.

The disclosure thus makes it possible to provide a hand-held power tool with an overload clutch in which the axial bearing enables a rolling movement between radially and axially moving parts and thus a reduction in friction with an associated reduction in wear can be achieved.

Preferably, an axis of rotation of the overload clutch is arranged parallel to an axis of rotation of the drive unit and perpendicular to an axis of rotation of the power take-off unit.

This enables a suitable arrangement of the overload clutch in a simple manner.

Preferably, the drive unit is operatively connected to a drive coupling element assigned to the overload clutch via a transmission element.

This enables simple and uncomplicated torque transmission from the drive unit.

The overload clutch preferably comprises a power take-off coupling element that is operatively connected to a transmission element of the power take-off unit.

This makes it easy and reliable to transmit torque from the overload clutch to the power take-off unit or to lock it.

According to one embodiment, the hand-held power tool is designed as a hammer drill, wherein the power take-off unit has a hammer pipe.

This makes it easy to equip a hammer drill with the overload clutch according to the disclosure.

Preferably, the transmission element of the power take-off unit is designed for the rotating drive of the tool holder, and the drive unit is assigned an eccentric unit for the percussive actuation of the tool holder.

This enables easy and uncomplicated drilling operation, impact drilling operation and/or impact operation.

BRIEF DESCRIPTION OF THE DRAWINGS

The disclosure is explained in further detail in the following description with reference to exemplary embodiments shown in the drawings. The figures show.

DETAILED DESCRIPTION

Figure 1:
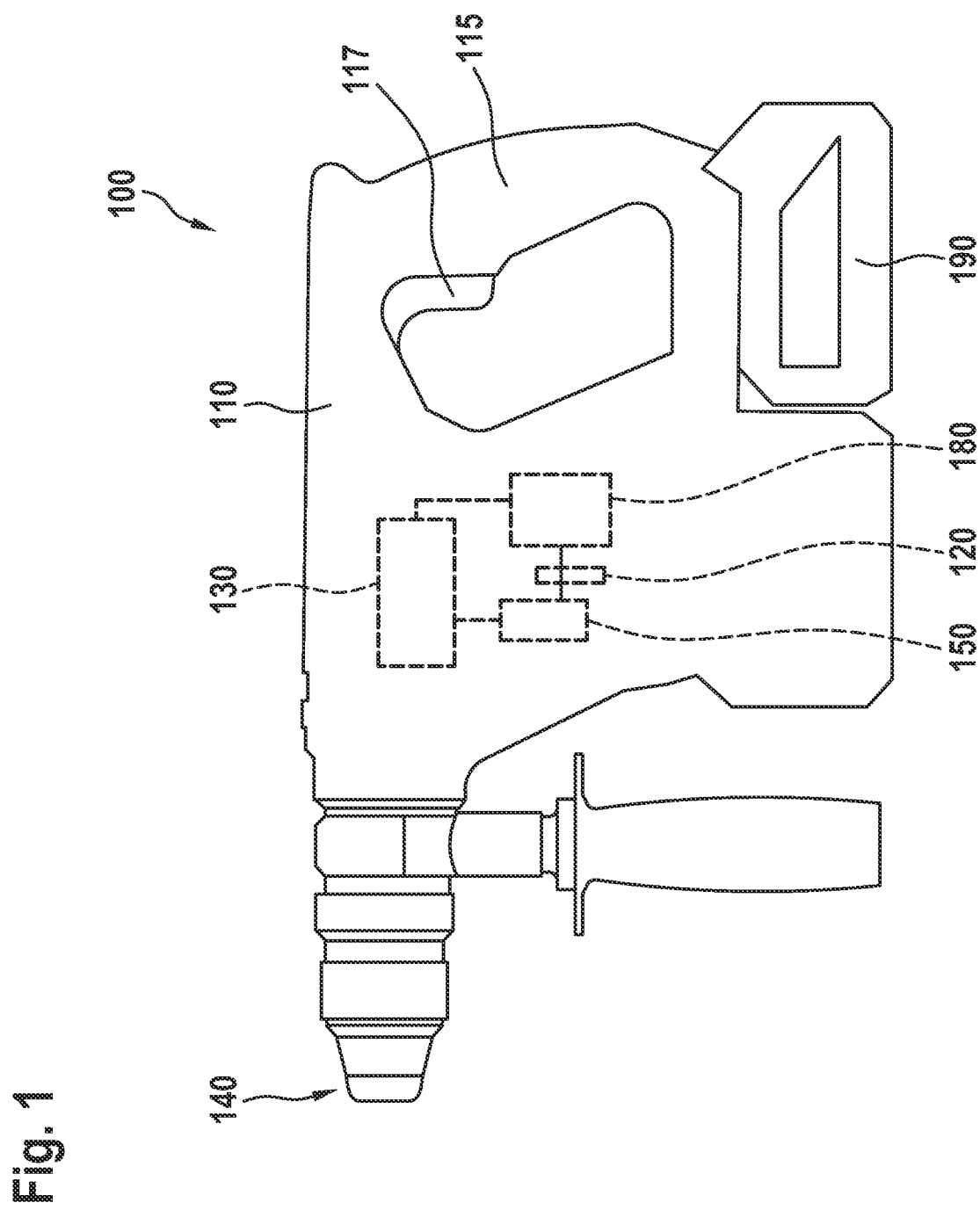
FIG. 1 is a schematic view of a hand-held power tool with an overload clutch according to the disclosure.

Elements having the same or a comparable function are provided with the same reference characters in the drawings and are described in detail only once.

FIG. 1 shows a hand-held power tool 100 with a housing 110 in which a drive unit 120 is arranged for driving a power take-off unit 130. The hand-held power tool 100 is illustratively designed as a hammer drill. The hand-held power tool 100 is mechanically and electrically connected to a battery pack 190 for mains-independent power supply. However, the hand-held power tool 100 may also have a mains-dependent power supply.

Preferably, at least one drive motor is assigned to the drive unit 120 for driving the power take-off unit 130. The drive motor can be switched on and off via a manual switch 117, wherein the manual switch 117 can be arranged on a handle 115 of the housing 110. Furthermore, an eccentric unit 180 is illustratively associated with the drive unit 120.

Preferably, the power take-off unit 130 comprises at least one tool holder 140. Furthermore, a hammer pipe is preferably associated with the power take-off unit 130. Preferably, a transmission element of the power take-off unit 130 is designed for the rotating driving of the tool holder 140 and the eccentric unit 180 of the drive unit 120 is designed for the percussive actuation of the tool holder 140.

An overload clutch 150 is arranged between the drive unit 125 and the power take-off unit 130. The overload clutch 150 is designed to decouple the drive unit 120 from the power take-off unit 130 when a predetermined limit torque is exceeded. Preferably, the drive unit 120 is arranged between the overload clutch 150 and the eccentric unit 180. An axial bearing (255 in FIG. 2) is assigned to the overload clutch 150 to reduce friction and wear.

Figure 2:
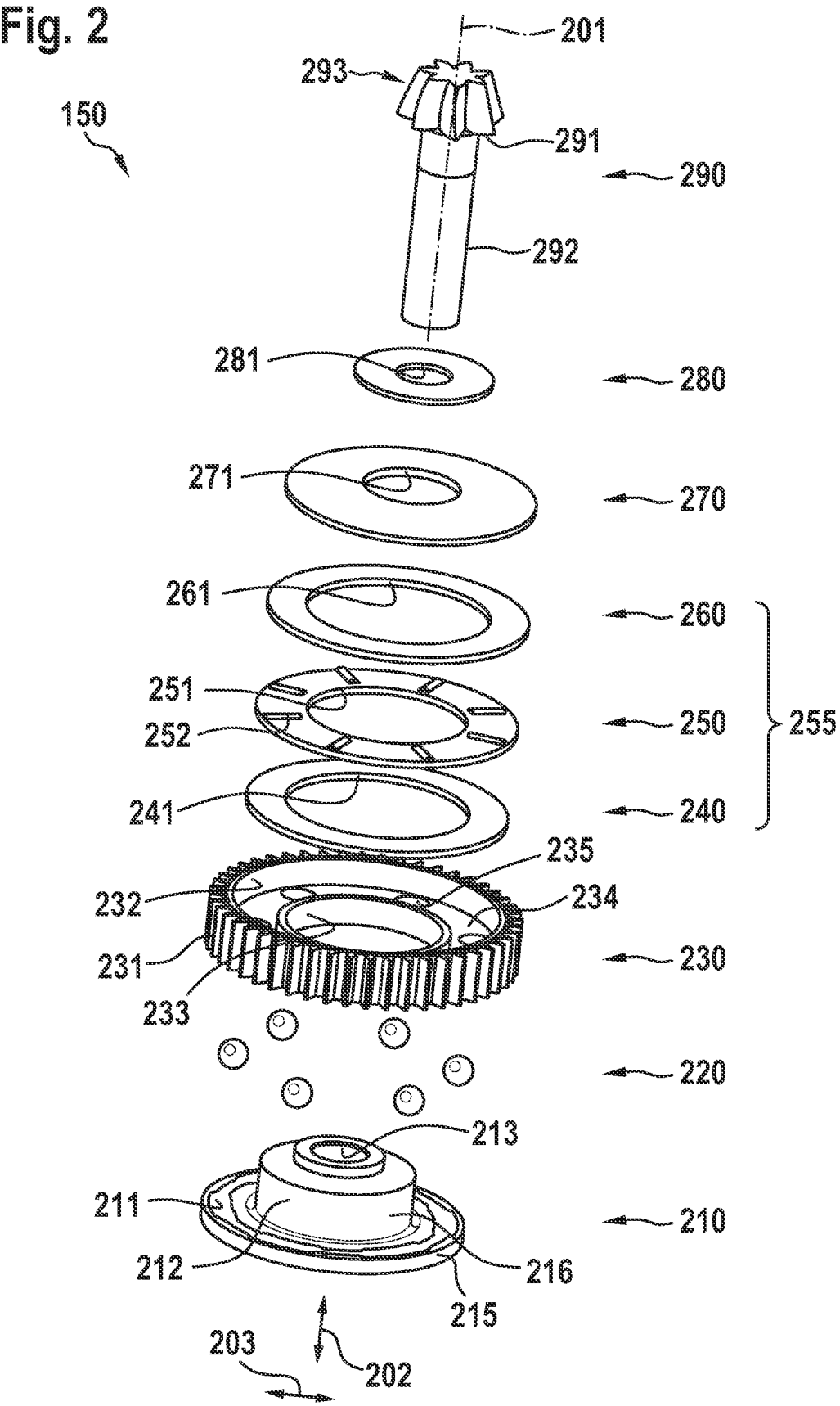
FIG. 2 a perspective exploded view of the overload clutch of FIG. 1.

FIG. 2 shows the overload clutch 150 of FIG. 1. The overload clutch 150 is preferably designed as a rotating slipping clutch with an associated axis of rotation 201. For this purpose, the overload clutch 150 preferably has a clutch shaft 290 with a pin-shaped region 292 and a power take-off coupling element 293. The power take-off coupling element 293 preferably has an external toothing, which is preferably operatively connected to a transmission element of the power take-off unit 130 of FIG. 1. Preferably, the power take-off coupling element 293 forms a leading edge 291 or an axial stop formed in the axial direction 202. The axial direction 202 is aligned along the axis of rotation 201 and a radial direction 203 is aligned perpendicular to the axis of rotation 201.

In the assembled state of the overload clutch 150, a disc 280 is preferably arranged on the leading edge 291. For arrangement on the clutch shaft 290 or the pin-shaped region 292, the disc 280 illustratively has an internal recess 281. A spring element 270 is arranged on the clutch shaft 290 adjacent to or illustratively below the disc 280 in the axial direction 202. For this purpose, the spring element 270 has, by way of example, an internal recess 271. The spring element 270 is preferably designed as a spring disc.

Furthermore, a drive coupling element 230 is provided. Preferably, the drive coupling element 230 is configured as a gearwheel. For this purpose, the drive coupling element 230 has a gearing 231 on its outer circumference. In addition, the drive coupling element 230 illustratively has an internal recess 233.

According to one embodiment, the drive coupling element 230 comprises an internal receptacle 232 with an annular mounting bar 234. The mounting bar 234 preferably comprises receptacles 235 for accommodating detent bodies 220. According to one embodiment, the detent bodies 220 are designed as balls, but can also be designed as rollers. The detent bodies 220 are acted upon by the spring element 270. Preferably, the drive coupling element 230 is designed for coupling with a transmission element of the drive unit 120.

In addition, a coupling element 210 is associated with the drive coupling element 230. Preferably, the drive coupling element 230 is operatively connected to the clutch shaft 290 by the coupling element 210. The drive coupling element 230 and the power take-off coupling element 291 are thus operatively connected to the clutch shaft 290.

The coupling element 210 illustratively comprises a pot-shaped base body with a cylindrical region 216 and an annular collar 215. An outer circumference 212 of the cylindrical region 216 is arranged at the internal receptacle 233 in the assembled state of the overload clutch 150. Furthermore, an internal recess 213 of the coupling element 210 is illustratively arranged on the clutch shaft 290 or the pin-shaped region 292. The coupling element 210 preferably has a guide path 211 on its annular collar 215 to guide the detent bodies 220.

When a predetermined limit torque is exceeded, the detent bodies 220 of the guide path 211 exceed associated detent projections (411 in FIG. 4), as a result of which the drive unit 120 decouples from the power take-off unit 130 due to a movement in the axial direction 202 against a spring force of the spring element 270.

According to the disclosure, an axial bearing 255 is assigned to the overload clutch 150. The axial bearing 255 preferably comprises an annular disc-shaped needle roller and cage assembly 250 with bearing rollers 252 distributed in the circumferential direction. Furthermore, the axial bearing 255 preferably comprises a disc 240, 260 at each of its two ends formed in the axial direction 202. The needle roller and cage assembly 250 illustratively has an internal recess 251 and the two discs 240, 260 each have an associated internal recess 241, 261. Preferably, the internal recess 251 of the needle roller and cage assembly 250 has a smaller diameter than the internal recess 241, 261 of the two discs 240, 260.

Illustratively, the axial bearing 255 is arranged in the direction of the axis of rotation 201 or in the axial direction 202 between the spring element 270 and the detent bodies 220. Furthermore, the axial bearing 255 is preferably arranged in a direction perpendicular to the axis of rotation 201 or radial direction 203 between the internal receptacle 232 of the drive coupling element 230 and the outer circumference 212 of the coupling element 210. Alternatively, the axial bearing 255 can also be arranged at an axial end of the drive coupling element 230 facing the power take-off coupling element 293. Preferably, the axis of rotation 201 of the overload clutch 150 is arranged parallel displaced to an axis of rotation of the drive unit 120 of FIG. 1 and perpendicular to an axis of rotation of the power take-off unit 130 of FIG. 1.

Figure 3:
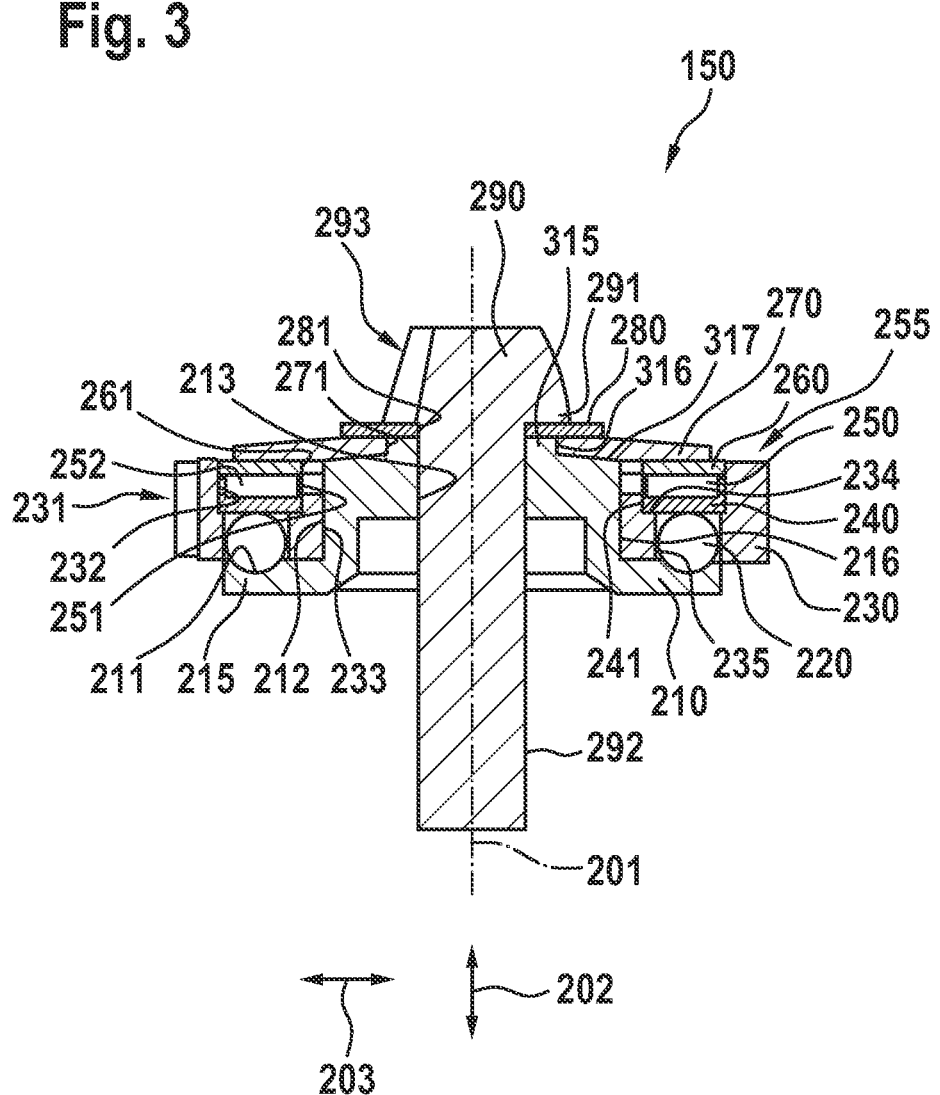
FIG. 3 a sectional view of the overload clutch of FIG. 1 and FIG. 2.

FIG. 3 shows the overload clutch 150 of FIG. 1 and FIG. 2 and illustrates the exemplary arrangement of the axial bearing 255 in the axial and radial directions 202, 203 within the drive coupling element 230. In the axial direction 202, the axial bearing 255 is arranged, as described above, between the internal receptacle 232 of the drive coupling element 230 and the outer circumference 212 of the coupling element 210. In addition, FIG. 3 illustrates the arrangement of the detent bodies 220 in the guide path 211 of the coupling element 210 and in the associated receptacles 235 of the drive coupling element 230.

Preferably, the internal receptacle 233 of the drive coupling element 230 is arranged so as to be displaceable in the axial direction 202 on the outer circumference 212 of the cylindrical region 216 of the coupling element 210. In turn, the internal recess 213 of the coupling element 210 is preferably arranged non-rotatably on the clutch shaft 290 or the pin-shaped region 292. In addition, the spring element 270 acts on the detent bodies 220 by acting on the axial bearing 255. Preferably, the spring element 270 is arranged on the clutch shaft 290 via an arrangement on the coupling element 210. In this case, the spring element 270 is arranged with its internal recess 271 on an outer circumference 316 of a tapered region 315 of the coupling element 210 facing the power take-off coupling element 293 of the clutch shaft 290. Preferably, the cylindrical region 216 of the coupling element 210 tapers into the tapered region 315 via a bottom surface 317.

Figure 4:
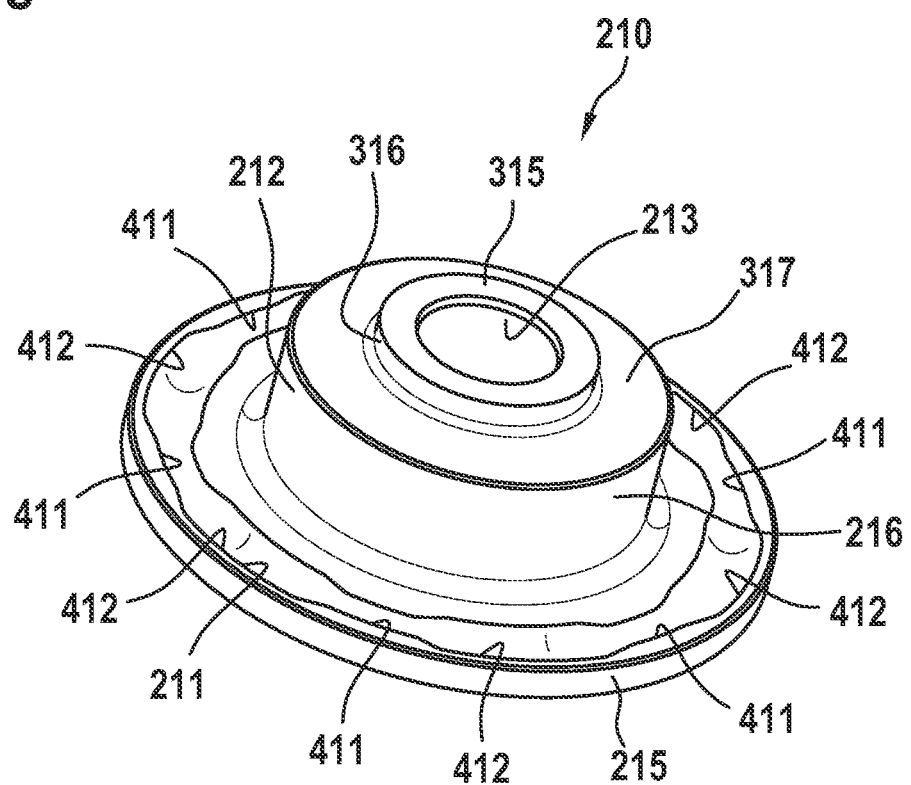
FIG. 4 a perspective view of a clutch part associated with the overload clutch.

FIG. 4 shows the coupling element 210 of the overload clutch 150 of FIG. 1 to FIG. 3 and illustrates the guide path 211 formed on the annular collar 215. The guide path 211 preferably comprises at least two and illustratively six detent body receptacles 412 along its circumference for receiving the detent bodies 220 in sections. A detent projection 411 is arranged between each of two detent body receptacles 412 that are adjacent in the circumferential direction. As described above, the drive unit 120 decouples from the power take-off unit 130 when a predetermined limit torque is exceeded, wherein the detent bodies 220 exceed the detent projections 411.

What is claimed is:

1. An overload clutch designed to be arranged between a drive unit and a driven unit of a hand-held power tool that is driven by the drive unit, the overload clutch comprising:
   a rotating slip clutch configured to be connected between the drive unit and the driven unit in the hand-held power tool and to enable decoupling of the drive unit from the driven unit when a limit torque is exceeded; and
   an axial bearing disposed in said rotating slip clutch and configured to reduce wear between rotating components of the rotating slip clutch, wherein;
      the rotating slipping clutch has an associated axis of rotation and includes a spring element and detent bodies acted upon by the spring element; and
      the axial bearing is arranged in the direction of the axis of rotation between the spring element and the detent bodies.

2. The overload clutch according to claim 1, further comprising:
   a drive coupling element directly engagable to the drive unit and defining an internal receptacle configured to receive the detent bodies; and
   a further coupling element which includes an outer circumference disposed within said internal receptacle and which defines a guide path for guiding the detent bodies,
   wherein the axial bearing is arranged in a direction perpendicular to the axis of rotation between the internal receptacle of the drive coupling element and the outer circumference of the further coupling element.

3. The overload clutch according to claim 1, further comprising:
   a drive coupling element directly engagable to the drive unit;
   a power take-off coupling element directly engagable to the driven unit; and
   said rotating slip clutch includes a clutch shaft operatively connecting said drive coupling element to said power take-off coupling element.

4. A hand-held power tool, comprising:
   a housing in which a drive unit is arranged for driving a driven unit that includes a tool holder; and
   the overload clutch arranged between the drive unit and the driven unit, wherein the overload clutch includes;
      a rotating slip clutch configured to be connected between the drive unit and the driven unit in the hand-held power tool and to enable decoupling of the drive unit from the driven unit when a limit torque is exceeded; and
      an axial bearing disposed in said rotating slip clutch and configured to reduce wear between rotating components of the rotating slip clutch, wherein;
      the rotating slipping clutch has an associated axis of rotation and includes a spring element and detent bodies acted upon by the spring element; and
      the axial bearing is arranged in the direction of the axis of rotation between the spring element and the detent bodies.

5. The hand-held power tool according to claim 4, wherein:
   the drive unit is a rotary drive unit having a first axis of rotation;
   the driven unit is a rotary unit having a second axis of rotation; and
   said overload clutch has a third axis of rotation arranged parallel displaced to the first axis of rotation of the drive unit and perpendicular to the second axis of rotation of the driven unit.

6. The hand-held power tool according to claim 4, wherein the overload clutch includes a drive coupling element operatively engaged to the drive unit.

7. The hand-held power tool according to claim 4, wherein the overload clutch includes a power take-off coupling element which is operatively connected to the driven unit.

8. The hand-held power tool according to claim 4, wherein:
   the hand-held power tool is configured as a hammer drill; and
   the driven unit is configured for percussive actuation of a tool holder connected to the driven unit.

9. The hand-held power tool according to claim 8, wherein:
   the driven unit is further configured for the rotating drive of the tool holder; and
   the drive unit includes an eccentric unit for the percussive actuation of the tool holder by the driven unit.

10. The hand-held power tool according to claim 6, wherein:
    the drive coupling element is directly engaged to the drive unit and defines an internal receptacle configured to receive the detent bodies; and
    the overload clutch includes a further coupling element which includes an outer circumference disposed within said internal receptacle and which defines a guide path for guiding the detent bodies,
    wherein the axial bearing is arranged in a direction perpendicular to the axis of rotation between the internal receptacle of the drive coupling element and the outer circumference of the further coupling element.

11. The hand-held power tool according to claim 6, wherein:
    the drive coupling element is directly engaged to the drive unit; and
    the overload clutch further includes;
    a power take-off coupling element directly engaged to the driven unit; and
    said rotating slip clutch includes a clutch shaft operatively connecting said drive coupling element to said power take-off coupling element.

* * * * *